United States Patent [19]

Anderson

[11] Patent Number: 5,425,930
[45] Date of Patent: Jun. 20, 1995

[54] PROCESS FOR FORMING LARGE SILICA SPHERES BY LOW TEMPERATURE NUCLEATION

[75] Inventor: David J. Anderson, Oak Lawn, Ill.

[73] Assignee: AlliedSignal Inc., Morris Township, Morris County, N.J.

[21] Appl. No.: 123,283

[22] Filed: Sep. 17, 1993

[51] Int. Cl.$^6$ ............................................. C01B 33/12
[52] U.S. Cl. ..................................... 423/338; 423/335
[58] Field of Search .................... 423/338, 335, 339

[56] References Cited

U.S. PATENT DOCUMENTS

| | | | |
|---|---|---|---|
| 3,634,558 | 1/1972 | Stober | 264/0.5 |
| 4,567,030 | 1/1986 | Yuasa | 423/326 |
| 4,775,520 | 10/1988 | Unger et al. | 423/335 |
| 4,842,837 | 6/1989 | Shimizu et al. | 423/335 |
| 4,940,571 | 7/1990 | Su et al. | 423/339 |
| 4,983,369 | 1/1991 | Barder et al. | 423/338 |
| 5,089,554 | 2/1992 | Bomo et al. | 524/493 |

FOREIGN PATENT DOCUMENTS

| | | | |
|---|---|---|---|
| 46-43617 | 12/1971 | Japan | 423/338 |
| 59-30730 | 2/1984 | Japan | 423/338 |
| 2-243508 | 9/1990 | Japan | 423/339 |

OTHER PUBLICATIONS

Stober et al., "Controlled Growth of Monodisperse Silica Spheres in the Micron Size Range", Jour. of Colloid & Interface Sci., 26, 62–69 (1968).

*Primary Examiner*—Gary P. Straub
*Assistant Examiner*—N. M. Nguyen
*Attorney, Agent, or Firm*—Harold N. Wells; Mary Jo Boldingh; Roger H. Criss

[57] ABSTRACT

A process for producing microspheres of silica having a maximum diameter of at least 2.5 μm particularly about 2.5 μm to 10 μm from the hydrolysis of a silica precursor, such as a tetraalkoxysilane, which is characterized by employing precursor solutions and feed rates which initially yield a two-phase reaction mixture and beginning the hydrolysis reaction with solutions cooled below ambient temperatures, preferably below about 10° C. Either monodisperse or polydisperse microspheres may be formed.

17 Claims, 6 Drawing Sheets

PROCESS FOR FORMING LARGE SILICA SPHERES BY LOW TEMPERATURE NUCLEATION

BACKGROUND OF THE INVENTION

This invention relates to an improved process for preparing small spheres of silica having many applications, such as for catalyst supports and in high pressure liquid chromatography. Such spheres are small, but very uniformly sized.

Stober, in U.S. Pat. No. 3,634,558 disclosed a method for making monodisperse silica spheres. An alcoholic aqueous ammonia solution was prepared and tetraalkyl silicates (i.e., tetraalkoxysilanes) were added with agitation. The effect of varying alcohols and alkylsilicates was reported. Stober noted that two different size particles were produced and to avoid this he reported that he relied on maintaining a uniform temperature of 22° C. and homogeneous suspension by gentle agitation. Generally, the patentee found that particles above 1 μm were difficult to produce with ethanol and ethyl esters. Making larger particles required the use of esters of higher alcohols. Of major importance was the effect of attaching radioactive tracers to the spheres.

Particles in the range of 0.1 to 1.0 μm were prepared by Yuasa et al., as discussed in U.S. Pat. No. 4,567,030. The patentees incorporated metals from Groups I, II, III, and IV of the Periodic Table with the hydrolyzable silicon compounds such as tetraalkyl silicates to form particles containing both silica and the selected metals as their oxides. They state that if the content of the metal oxide is 0.01 to 15 mol percent a true sphere with a uniform particle size is obtained. The patentees also observe that the amount of water affects the ability to produce spherical shape. Also, they state that it is ". - - - indispensable that a mixed solution of both the starting compounds should be prepared in advance." In their comparative example, the patentees demonstrate that spheres are not formed if silica and titanium precursors are added separately. Thus, Yuasa et al. teach that both silica and another metal oxide should be present in order to prepare uniform spherical particles, although only in the relatively small size range of 0.1–1.0 μm. In discussing the conditions affecting the particle size, the patentees observe that increasing the concentration of base (ammonia is preferred) increases the size of the particles and that increasing the water concentration also increases the particle size and further, that organic solvents having a greater number of carbon atoms produce larger particle sizes. Yuasa et al. did not discuss the effect of temperature on the particle sizes and judging from their examples they maintained the reaction mixture at 20° C. while the particles were being formed and grown.

A non-porous spherical particle of only silica was made by a different method discussed in U.S. Pat. No. 4,775,520 to Unger et al. Their particles were said to have mean particle diameters of 0.05 to 10 μm, although no particles larger than 3.1 μm were actually exemplified. A two-stage process was employed which was similar to one method of Yuasa et al. in that continuous addition of a tetraalkoxysilane was used to increase the size of the particles. The patentees defined their process as adding the silica precursor solution to a preformed sol of seed particles at a rate at which substantially no additional particles were formed, that is, the number of particles initially added determined the number of spheres produced. It was characteristic of the particles formed by Unger et al. that they were non-porous and highly uniform. They assumed that pores in the original seed particles are sealed by the secondary growth and that new pores do not form. Unger et al. recommend using reaction temperatures between 35° and 75° C., preferably between 40° and 65° C. They state that around room temperature larger particles are formed but that a wider range of particle sizes was produced. Their examples indicate that the reaction mixture was controlled at 40° C.

Shimizu et al. in U.S. Pat. No. 4,842,837 disclose a process for making fine silica spheres less than 0.1 μm used as a polish for semi conductor wafers. Hydrolysis of an alkoxysilane was carried out above 30° C. and the patentees indicated that lower temperatures were not desirable since larger spheres were formed. Their examples indicate that a constant temperature was maintained throughout the reaction.

Barder et al. in U.S. Pat. No. 4,983,369, which is incorporated by reference, disclose a method of producing microspheres of silica which involves the use of precursor solutions which are initially of such proportions that two-phase mixtures would form. This method produces highly uniform spherical particles. Barder et al. suggested that the reaction be carried out at 10° C. to 50° C. but did not indicate that control of the temperature was important to their results.

The previous workers in the field have suggested, but have not shown, that large, monodisperse spherical particles could be made. The present inventor has discovered an improved method of making uniform spheres which is capable of producing larger particles than have heretofore been available.

SUMMARY OF THE INVENTION

An improved process for producing uniform microspheres of silica having an maximum diameter of at least about 2.5 μm, preferably 2.5 to 10 μm, using a two-phase liquid mixture of the precursor solutions as discovered by Barder et al. but with nucleation initiated at relatively low temperatures, particularly below at least 10° C., preferably 1° C. to 8° C.

A hydrolyzable silica precursor, such as a tetraalkoxysilane, preferably tetraethoxysilane (TEOS), is reacted with water in a solution containing ammonia and an alcohol, preferably ethanol, in proportions such that two liquid phases would form. After nucleation at the low initial temperature, the seed particles are grown to microspheres of at least about 2.5 μm by addition of portions of the reactants while maintaining the temperature of the mixture at about 15° to 45° C., particularly 35°–40° C. Preferably, the added portions are at ambient temperature.

Only monodisperse microspheres are produced until the diameter reaches about 2.5 μm, after which secondary nucleation is observed and a polymodal distribution is formed. The largest particles continue to grow but they are mixed with much smaller particles. Such mixtures of particles may be recovered and used in applications where polymodal distributions have advantages.

The largest microspheres may be recovered and separated from the fines by a multi-step procedure of settling and decanting the supernatant liquid containing the fines. Any agglomerated spheres tend to settle first and may be eliminated by discarding the bottom of the settled bed of spheres. Alternatively, other methods may be used, such as filtering and sieving and the like. The monodisperse particles are useful in applications where uniformity of size is important.

DESCRIPTION OF THE PREFERRED EMBODIMENTS

Precursor Solutions

Broadly, the process is similar to that of Barder et al. in that it combines a hydrolyzable silica precursor, an alcohol (or a mixture of alcohols), ammonia, and water in proportions such that two phases would form. Typically, two precursor solutions will be prepared, although more than two could be employed if desired.

The first solution contains a hydrolyzable silica precursor, particularly a tetraalkoxysilane, represented by formula $Si(OR)_4$ where R is a lower alkyl group. Examples are tetramethoxysilane, tetraethoxysilane, tetrapropoxysilane, tetrabutoxysilane, tetraisopropoxysilane, tetraisobutoxysilane and tetrasecbutoxysilane. Tetraethoxysilane, also known as tetraethylorthosilicate (TEOS), with or without an alcohol, is a preferred source of the silica microspheres. When an alcohol solvent is used, typically it will be the same as is produced by hydrolysis of the silica precursor but this is not required. A mixture of alcohols may be used if desired and it should be understood that "an alcohol" as used herein is meant to include such mixtures. The hydrolyzable silica precursor, such as tetraethoxysilane, reacts with water to decompose into silica, probably via intermediate compounds which subsequently react further to provide silica. When tetraethoxysilane is the silica precursor, the reaction with water produces ethanol and silica or the intermediate compounds formed as the ethoxy moieties react with water.

Alkoxysilanes which include alkyl groups such as the alkyltrialkoxysilanes may be included in the precursor solutions to provide silica spheres containing alkyl moieties. Examples of such alkylalkoxysilanes are methyl triethoxysilane, ethyltriethoxysilane, and the like.

The second precursor solution is an aqueous ammonia solution, also optionally containing an alcohol. Generally, although it is not necessary, an alcohol consistent with the alcohol produced by hydrolysis of the tetraalkoxysilane typically is employed. For example, ethanol would be used when the silica precursor is tetraethoxysilane. Alternatively, other alcohols could be used, provided that spherical silica particles are formed. However, at least one of the precursor solutions will contain an alcohol, preferably an alkanol corresponding to that produced by the hydrolysis of the silica precursor.

The composition of the precursor solutions will be determined by the desired composition of the reacting mixture. Thus, the composition of each precursor solution may be adjusted and the rate at which the solution is added also may be varied to provide the desired composition in the reacting mixture. It will be evident that considerable flexibility is available in the process since the composition of the precursor solutions can be varied as well as their relative rates of addition.

The composition of the combined solutions will be such that the reaction mixture initially forms two phases. Broadly, such compositions may be 20 to 50 wt. % silica precursor, 5 to 30 wt. % alkanol, 40 to 70 wt. % water, and 5 to 10 wt. % ammonia. Preferred compositions would be within the range of 25 to 35 wt. % silica precursor, 5 to 10 wt. % alkanol, 50 to 60 wt. % water, and 5 to 15 wt. % ammonia.

The hydrolysis reaction produces an alcohol by-product which adds to the alcohol in the precursor solutions and the two phases initially present become miscible and only a single phase remains. When the silica precursor is tetraethoxysilane and ethanol is the solvent, the combined and reacting solutions appear to become single phase when the solution reaches about 45 wt. percent ethanol.

The Process

It was typical of the prior art that primary particles (seeds) were preformed, which were later grown to larger sizes. Barder et al. concluded that if no seed or preformed microspheres were present when the precursor solutions were mixed, the initial hydrolysis reaction appeared to determine the number of initial particles (by nucleation), which are thereafter grown to the desired diameter. They believed that conditions in the initial two-phase reacting solution determined the number and size of the particles and indirectly their ultimate size. I have now found that the number of initial (seed) particles is reduced as the temperature of the initial solutions is lowered, which permits large microspheres to be readily produced. More specifically, I have found that if the initial solutions are cooled to near the freezing point, preferably below about 10° C., particularly between about 1°–8° C., that fewer seed particles evidently are formed since much larger microspheres can be grown more rapidly than has heretofore been possible.

Barder et al. had suggested that the process will be carried out at near room temperature, but it was considered to be feasible at temperatures in the range of 10° to 50° C. They expected that the temperature would affect reaction rates and solubility of the reactants and an optimum temperature should be selected, however, they gave no indication that lowering the initial temperature would permit larger particles as in the present invention. It should be understood that the hydrolysis reaction releases heat which raises the temperature of the reacting mixture. Thus, when the nucleation is initiated at temperatures below 10° C., the temperature will rise until the hydrolysis is completed, after which the temperature would decline. In the examples below, additional portions of the reactants are introduced regularly so that, among other things, the temperature remains in the desired range for particle growth, namely about 35° C. to 45° C. These additional portions of the reactants typically will be at ambient temperature to minimize the cooling effect when added to a warmer reacting slurry. The actual temperature used for the reacting slurry or added portions of reactants could be adjusted by suitable means of cooling or heating as desired.

There is no known need to operate under elevated or sub-atmospheric pressures, but they are not necessarily excluded if desirable for other reasons. The degree of mixing of the reactants would also be expected to affect the results. Generally, low shear mixing will be employed.

For purposes of the following discussion, the preferred silica precursor tetraethoxysilane will be considered as it reacts with water in the presence of ammonia and ethanol and produces additional ethanol and silica or the intermediate ethoxysilanols. As a molecule of tetraethoxysilane reacts with a molecule of water, a molecule of ethanol is formed, leaving the intermediate compound triethoxysilanol, $(EtO)_3Si(OH)$, which can be further reacted with another molecule of water or with another molecule of tetraethoxysilane or an intermediate thereof. While the finished particles are substantially only silica, the composition of the reacting surface of any individual particle at any time during the process is unknown, but it seems likely that the particle will contain both silica and the intermediate products at the same time. It seems probable also that the presence of the by-product ethanol will influence the access of water molecules to the reacting silicon compounds, but the actual effect is not known. However, it is observed that when two phases are present in the reacting solution, which is vigorously agitated, reacting tetraethoxysilane forms a dispersed phase in an ethanol-water ammonia continuous phase. It is believed that the particles of tetraethoxysilane serve to saturate the surrounding solution at all times. Once enough ethanol has been produced, the tetraethoxysilane is completely dissolved and the amount of tetraethoxysilane available for reaction is determined by the addition rate.

The particles can be grown by continuing to add the precursor solutions until the microspheres reach a size of about 2.5 μm at which time new seed particles begin to be formed to create a polymodal distribution of particles sizes. Typically, the precursor solutions will continue to be added at the same rates used during the two-phase reaction and the spheres grown at an accelerated rate. Optionally, the addition rates can be increased or decreased as the spheres grow. The precursor solutions may be added continuously or periodically since both have been found to produce similar results.

By cooling to a temperature well below ambient, the number of seed particles initially formed evidently is much reduced since much larger particles are formed from the same amount of tetraethoxysilane as is shown in Example 7 below. Thus, adding precursor solutions causes increased size of the final particles since the silica formed by hydrolysis of tetraethoxysilane has fewer surfaces on which it can be deposited.

Initially the microspheres have a relatively high surface area, but such porous spheres may be converted to low porosity spheres by recovering and redispersing the porous spheres in water for up to about 24 hours after addition of the precursor solutions has ceased. Also lengthy contact with the solution after the addition of the silica precursor has ceased will tend to produce low surface area spheres. There is no need to add the silica precursor at a low rate to close the pores as taught by Unger et al. The porosity may be maintained by harvesting the spheres at once and avoiding further contact with water, for example by storing them in ethanol.

While the principal objective is to generate monodisperse (i.e. uniform size) microspheres, polydisperse microspheres may be desired in certain applications. Consequently, the process of the invention can be carried out so that either large monodisperse spheres of 2.5 μm diameter or greater are produced or alternatively polydisperse spheres having a maximum diameter of at least 2.5 μm up to 10 μm or even larger diameter if desired. There is no known upper limit to the sphere diameter which might be produced by the process, although practical considerations appear to make the process less attractive above about 10 μm.

It has been found that microspheres having a diameter of about 2.5–3 μm can be made without the presence of significant amounts of fines. The larger particles are made along with smaller ones (i.e. below 2.5 μm) and these polydisperse microspheres may be recovered together for appropriate uses where monodispersity is not required or where polydispersity is advantageous. However, a monodisperse group of large microspheres (i.e. above 2.5–3 μm) can be made by a separation process of settling and decantation as illustrated in the examples below. Fine particles remain suspended and are removed with the supernatant liquid; any agglomerates tend to settle first and can be eliminated by discarding the bottom portion of the settled bed. Alternatively, other methods may be used, such as filtering, sieving and the like.

In the following examples, the feed solutions are premixed and placed in reservoirs where they are added with stirring to a reactor vessel stepwise using premeasured volumes over predetermined time intervals. Typically, the reservoir containing the tetraalkoxysilane is kept under a nitrogen purge to exclude moisture.

EXAMPLE 1

Preparation of 2.5 μm Spheres

To a two liter beaker was added 200 mL of a hydrolysis mixture containing 38.5 vol. % deionized water, 13.5 vol. % ethanol, and 48 vol % aqueous ammonia (29.5 wt. % $NH_3$) and then 100 mL of tetraethoxysilane (TEOS), both of the liquids and the beaker having been previously cooled to 4.5° C. The mixture was stirred with a 4.5 inch (114.3 mm) diameter A130 (Lightnin Co.) propeller mixer at 280 rpm. Nucleation began after about 3 minutes while the temperature was still about 7° C. After 5 minutes, the same quantities of reagents used to form seed particles were added and this was repeated every five minutes until after 40 minutes 900 mL of TEOS and 1800 mL of the hydrolysis solution had been added. The reagents were added at room temperature (about 23° C.) and the mixture maintained at a temperature of about 40° C. during the 40 minutes in which the seed particles were grown. Examination of the resulting spheres by microscope showed them to have a diameter of 2.5 μm, with very few fine particles.

EXAMPLE 2

Preparation of 2.5 μm Spheres

Figure 1A:
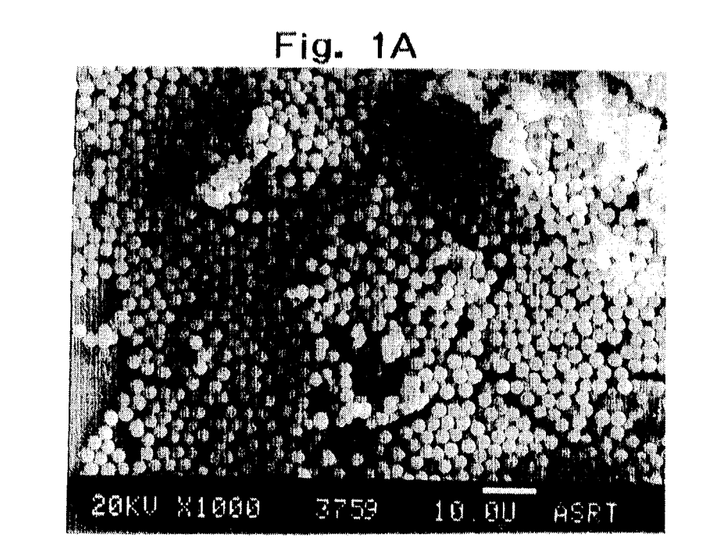
FIGS. 1A and 1B are two photomicrographs of spheres produced in Example 2.
Figure 1B:
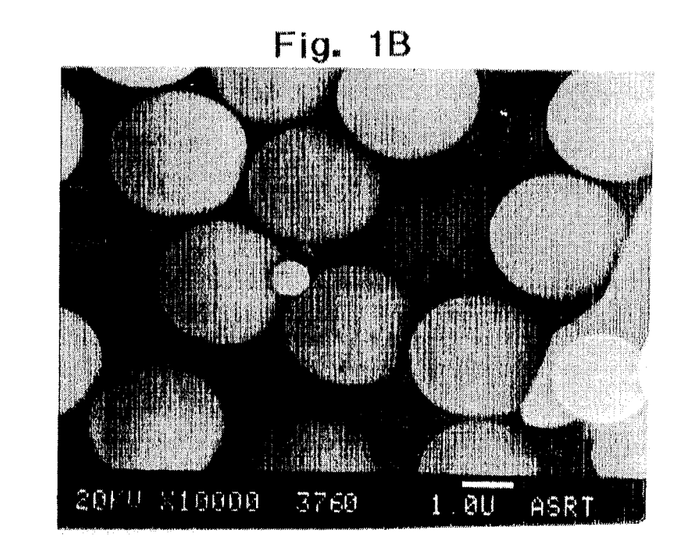

The procedure of Example 1 was repeated except that the initial temperature was lowered to 1° C., the stirring speed was reduced to 150 rpm, and a total of 1100 mL of TEOS and 2200 mL hydrolysis solution were added. The product again was found to be monodisperse, that is, to have a uniform diameter of 2.5 μm with only a small amount of agglomerated particles and fines, as may be seen in the two photomicrographs (A and B) of FIG. 1, taken at two different magnifications.

EXAMPLE 3

Preparation of Bimodal 3.5 μm/1 μm Particles

Figure 2A:
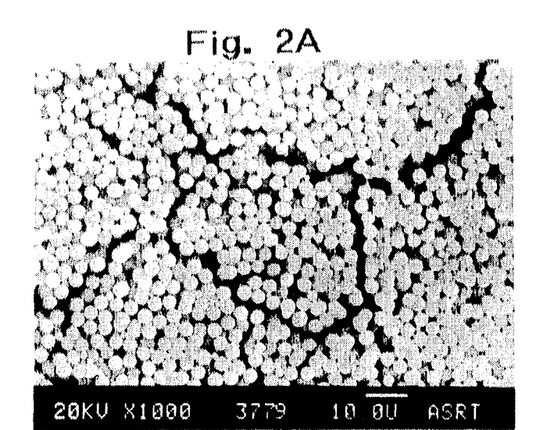
FIGS. 2A, 2B and 2C are three photomicrographs of spheres produced in Example 3.
Figure 2B:
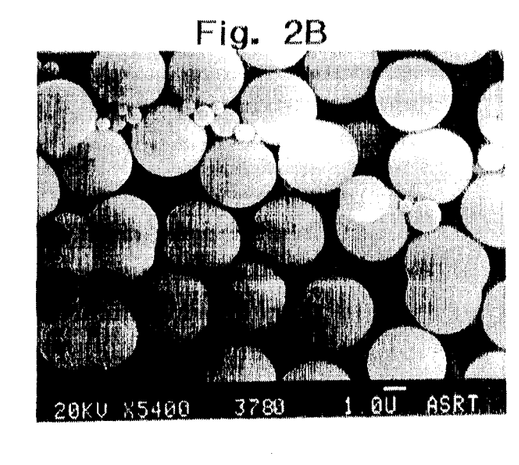
Figure 2C:
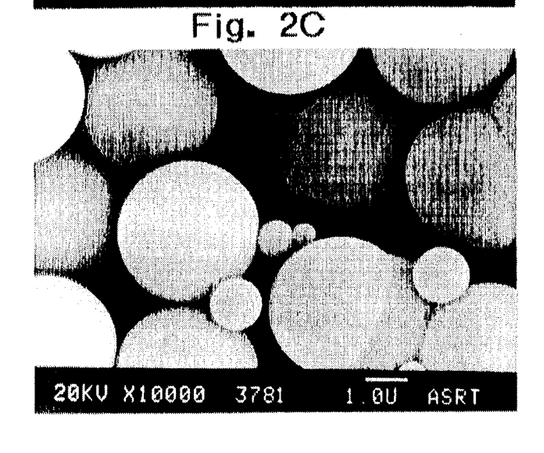

The procedure of Example 2 was repeated for the nucleation step. Then, six portions each of 200 mL hydrolysis solution and 100 mL TEOS were added every five minutes (for a total of 1400 mL hydrolysis solution and 700 mL TEOS) while the temperature of the mixture rose to and was maintained at about 40° C. The slurry mixture was transferred to a 4-liter beaker and stirring continued at 150 rpm. Nine additional portions of each of the two reacting solutions were added at five minute intervals until a total of 1600 mL TEOS and 3200 mL hydrolysis solution were in the beaker. A large number of fine particles were observed. Seven portions each of 100 mL hydrolysis solution and 50 mL TEOS were added at 5 minute intervals for a total of 1950 mL TEOS and 3900 mL hydrolysis solution. The slurry was then divided in half and an additional six portions each of 100 mL hydrolysis solution and 50 mL TEOS were added to one-half of the slurry. The three photomicrographs (A, B, and C) of FIG. 2 taken at three different magnifications show that a bimodal mixture of spheres was formed. The principal size was 3.5 μm, with smaller particles less than 1 μm in diameter also present. It was concluded from the results of Examples 2 and 3 that secondary nucleation had occurred when the size of the silica spheres exceeded about 2.5 μm.

EXAMPLE 4

Separation of 3.5 μm Particles

Figure 3A:
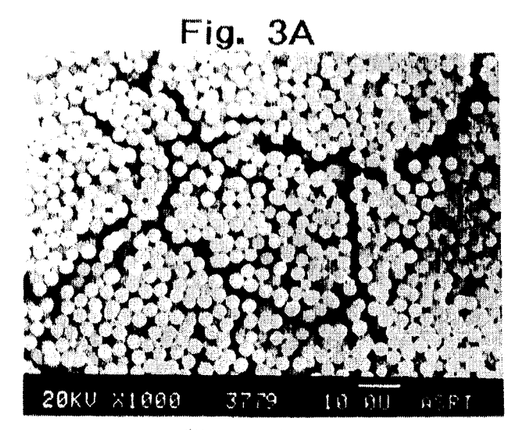
FIGS. 3A, 3B, 3C and 3D are four photomicrographs of spheres produced in Example 4.
Figure 3B:
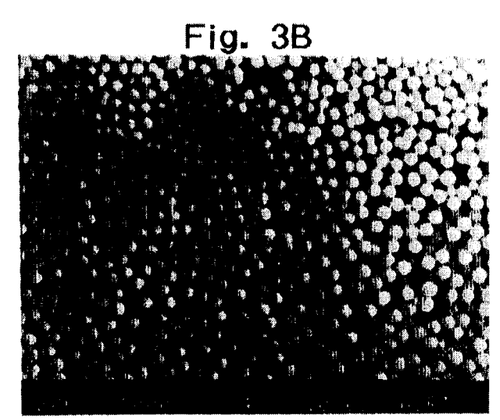
Figure 3C:
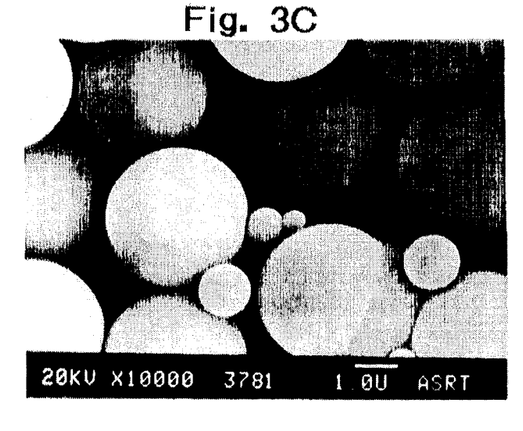
Figure 3D:
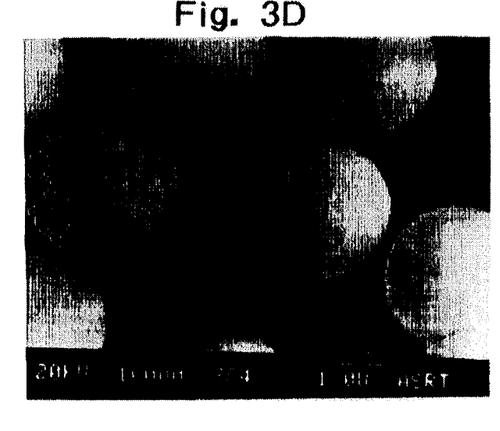

The second half of the slurry separated in Example 3 was placed in a 4-liter beaker and 2 liters of water was added with stirring. After the mixture was well dispersed, stirring was stopped and the particles were allowed to settle for 8 hours. The supernatant liquid was decanted and the remaining bed of particles was redispersed in 2 liters of water and the procedure repeated for two additional times, except that the period for settling was reduced from 8 hours to 2 hours. After the final settling period, the solids collected were dried at 70° C. for at least 12 hours and then examined by SEM. The results shown in the four photomicrographs (A, B, C, and D) of FIG. 3 taken at two different magnifications illustrate the effectiveness of the procedure in separating the large 3.5 μm spheres from the small ones. FIGS. 3A and 3B show the presence of small particles, while FIGS. 3C and 3D show the effect of the separation process.

EXAMPLE 5

Preparation of 5.0 μm Particles

Figure 4A:
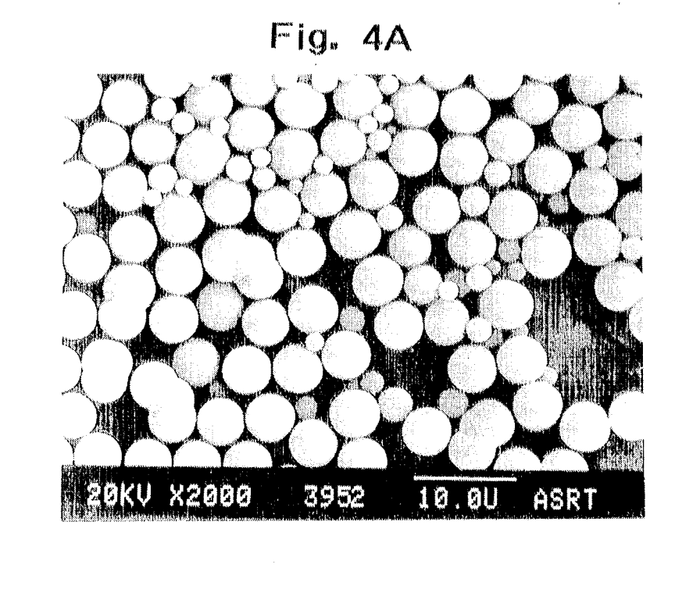
FIGS. 4A and 4B are two photomicrographs of spheres produced in Example 5.
Figure 4B:
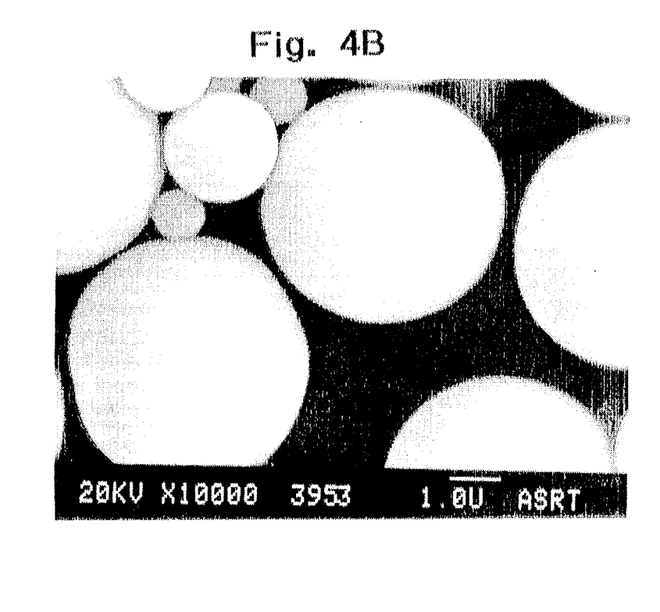

The procedure of Example 2 was repeated except that a total of 2700 mL TEOS and 5400 mL hydrolysis solution were added. The spheres were examined by an optical microscope and found to have a diameter of about 4 μm, with smaller particles present as before. The slurry was divided in half and additional 500 mL TEOS and 1000 mL hydrolysis solution added stepwise in 100 mL and 200 mL portions as before. Examination of the particles by SEM shows in the photomicrographs FIGS. 4A and 4B taken at two different magnifications that the large spheres had been grown to about 5 μm size. Many fine particles were also present.

EXAMPLE 6

Separation of 5 μm Particles

Figure 5A:
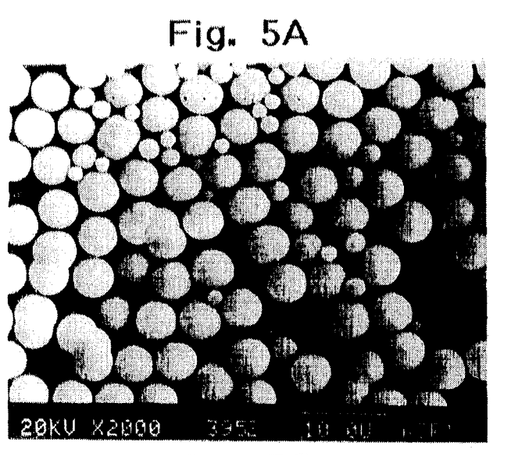
FIGS. 5A, 5B, 5C and 5D are four photomicrographs of spheres produced in Example 6.
Figure 5B:
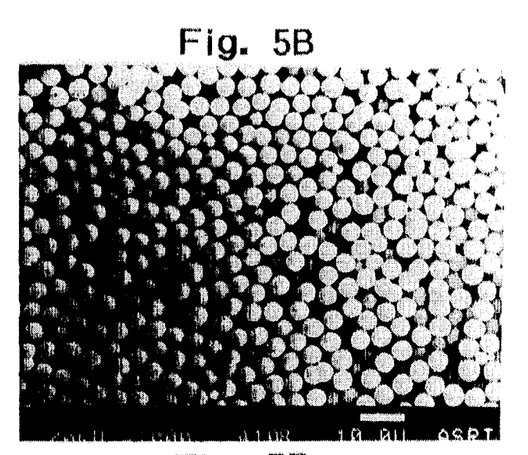
Figure 5C:
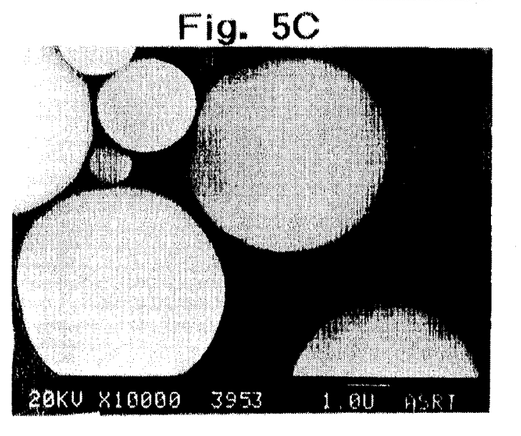
Figure 5D:
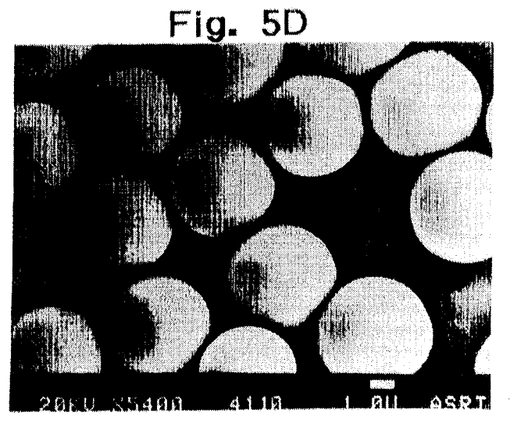
Figure 6:
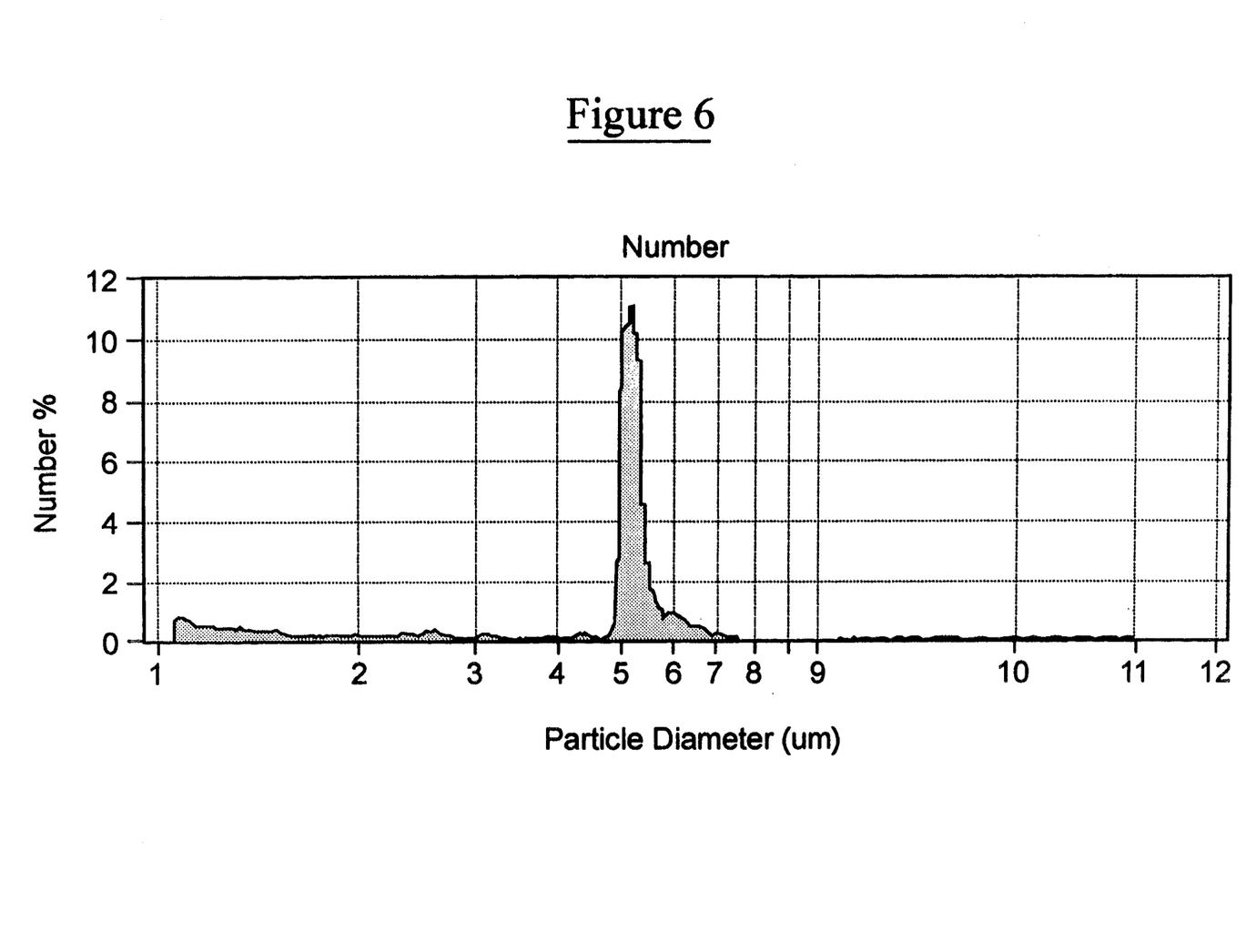
FIG. 6 is a particle size histogram of the spheres produced in Example 6.

The product slurry of Example 5 was stirred with 3 liters of water in a 4-liter beaker until they were well dispersed and then allowed to settle for 8 hours. As before, the supernatant liquid was decanted and the procedure was repeated three times. The settled bed from the final decantation was dried at 70° C. for at least 12 hours an then examined by SEM. The separated particles are shown in two micrographs of FIG. 5 (5A and 5B) and compared with the particles prior to the separation process (FIGS. 5C and 5D). In each instance two different magnifications are shown. The separated product was analyzed with a Coulter Multisizer II after first being dispersed in a solution of an aqueous electrolyte solution supplied by Coulter. The results are displayed in FIG. 6, where it can be seen that the spheres are predominantly 5.1 μm in diameter.

EXAMPLE 7

(Comparative)

The procedure of Example 1 was repeated except that the initial solutions were at room temperature (~23° C.) rather than 4.5° C. and a total of 1300 mL of TEOS and 2400 mL of hydrolysis solution were added, rather than the 900 mL TEOS and 1800 mL hydrolysis solution of Example 1. A sample was removed from the resulting slurry and examined under the scanning electron microscope. The microspheres were found to have a diameter of 1.3 μm.

Example 1 according to the invention made microspheres having a diameter of 2.5 μm, although much less TEOS was added. Thus, it is clear that many fewer, but larger, microspheres must have been formed using the process of the invention.

I claim:

1. A process for producing microspheres of silica having a maximum diameter of at least about 2.5 μm comprising:
    (a) mixing at a temperature between 1° C. and 8° C. a hydrolyzable silica precursor, an alcohol, ammonia and water in suitable proportions to form a cool mixture containing two liquid phases;
    (b) forming a seed particle containing slurry by hydrolysis of the silica precursor in the cool mixture of (a);
    (c) growing the seed particles of (b) to microspheres having said maximum diameter by adding to the seed particle containing slurry of (b) an additional mixture comprising said hydrolyzable silica precursor, said alcohol, ammonia and water while maintaining the temperature of the resulting mixture in the range of 15° to 45° C.
    (d) recovering the microspheres formed in (c).

2. The process of claim 1, wherein the cool mixture of step (a) and the mixture of step (c) are formed by mixing a first component comprising said hydrolyzable silica precursor, with a second component comprising ammonia and water, and a third component comprising said alcohol.

3. The process of claim 2 wherein said third component is mixed with said first component before being mixed with said second component or said third component is mixed with said second component before being mixed with said first component.

4. The process of claim 1 wherein the mixture of (c) is at ambient temperature and is added stepwise.

5. The process of claim 1 wherein the hydrolyzable silica precursor is at least one member of the group consisting of tetralkoxysilanes and alkylalkoxysilanes.

6. The process of claim 5 wherein the hydrolyzable silica precursor is tetraalkoxysilane.

7. The process of claim 6 wherein the tetralkoxysilane is tetraethoxysilane.

8. The process of claim 1 wherein said alcohol is at least one member of the group consisting of methanol, ethanol, propanols, butanols, and pentanols.

9. The process of claim 8 wherein said alcohol is ethanol.

10. Process of claim 1 wherein the mixture of (a) is 20–50 wt. % hydrolyzable silica precursor, 5–30 wt. % alcohol, 40–70 wt. % water, and 5–10 wt. % ammonia.

11. The process of claim 10 wherein said hydrolyzable silica precursor is tetralkoxysilane and said alcohol is the same as that produced by hydrolysis of said tetraalkoxysilane.

12. The process of claim 11 wherein said tetraalkoxysilane is tetraethoxysilane and said alkanol is ethanol.

13. The process of claim 1 wherein the microspheres of (c) have a diameter in the range of about 2.5 to 10 $\mu$m.

14. The process of claim 1 wherein the microspheres of (c) are monodisperse and have a diameter of about 2.5 $\mu$m.

15. The process of claim 1 wherein the microspheres of (c) are polydisperse and have a diameter of greater than 2.5 $\mu$m.

16. The process of claim 1 wherein the recovery of (d) comprises the steps of
  (d)(1) adding water to the microspheres mixture produced in (c), mixing and allowing the microspheres with a selected diameter of greater than 2.5 $\mu$m to settle, producing a supernatant solution containing fine particles with diameter less than said selected diameter;
  (d)(2) decanting the supernatant solution from the settled microspheres of (d)(1);
  (d)(3) repeating the procedure of (d)(1) to (d)(2) until the settled microspheres are substantially monodisperse and substantially free of said fine particles;
  (d)(4) optionally separating any agglomerates from the settled microspheres of (d)(3); and
  (d)(5) drying the monodisperse microspheres.

17. The process of claim 16 wherein the monodisperse microspheres have a diameter of about 2.5 to 10 $\mu$m.

* * * * *